United States Patent [19]

Stoy et al.

[11] Patent Number: 4,943,618

[45] Date of Patent: Jul. 24, 1990

[54] METHOD FOR PREPARING POLYACRYLONITRILE COPOLYMERS BY HETEROGENEOUS REACTION OF POLYACRYLONITRILE AQUAGEL

[75] Inventors: Vladimir A. Stoy; George P. Stoy; Jan Lovy, all of Princeton, N.J.

[73] Assignee: Kingston Technologies Limited Partnership, Dayton, N.J.

[21] Appl. No.: 135,070

[22] Filed: Dec. 18, 1987

[51] Int. Cl.$^5$ .............................................. C08F 8/40
[52] U.S. Cl. .............................. 525/340; 525/329.1; 525/329.2; 525/329.3; 525/344; 525/353; 525/355; 525/366; 525/367; 525/368; 525/369; 525/377; 525/386
[58] Field of Search ............... 525/329.1, 329.2, 329.3, 525/366, 367, 368, 369, 340, 344, 353, 355, 377, 386

[56] References Cited

U.S. PATENT DOCUMENTS

| | | | |
|---|---|---|---|
| 2,558,730 | 7/1951 | Cresswell | 18/54 |
| 2,558,731 | 7/1951 | Cresswell | 18/54 |
| 2,558,732 | 7/1951 | Cresswell | 18/54 |
| 2,558,733 | 7/1951 | Cresswell | 18/54 |
| 2,558,734 | 7/1951 | Cresswell | 68/181 |
| 2,558,735 | 7/1951 | Cresswell | 18/47.5 |
| 2,579,451 | 12/1951 | Poison | 18/54 |
| 2,790,700 | 4/1957 | Stanton et al. | 18/54 |
| 2,812,317 | 11/1957 | Barrett | 260/88.7 |
| 2,861,059 | 11/1958 | Mowry et al. | 260/88.5 |
| 2,948,581 | 8/1960 | Cummings | 18/54 |
| 3,073,669 | 1/1963 | Fujisaki et al. | 18/54 |
| 3,080,209 | 3/1963 | Fujisaki et al. | 18/54 |
| 3,200,102 | 8/1965 | Kleiner | 260/88.7 |
| 3,368,015 | 2/1968 | Irion et al. | 264/182 |
| 3,689,621 | 9/1972 | Fuji et al. | 264/182 |
| 3,709,842 | 1/1973 | Stoy | 260/2.5 R |

(List continued on next page.)

OTHER PUBLICATIONS

Lovy, Coll, Czech. Chem. Comm. 49 505–512 (1984).
Bohn et al., J. Poly. Sci. 55 531–549 (1961).
U.S. Dept. of the Interior: Reasearch & Development of New Polymer Systems for Reverse Osmosis Membranes Progress Report No. 167–Feb. 1966.
U.S. Dept. of the Interior: Research & Development of New Polymer Systems for Reverse Osmosis Membranes, Progress Report No. 220–Nov. 1966.
J. Soler et al., Macromolecular Chem. 49: 49–58 (1976).
Janacek et al., J. Polymer Sci. Symposium #53 299–312 (1975).

Primary Examiner—Joseph L. Schofer
Assistant Examiner—Bernard Lipman
Attorney, Agent, or Firm—Richard C. Woodbridge

[57] ABSTRACT

A method is disclosed for preparing polyacrylonitrile copolymers by Heterogeneous reaction of polyacrylonitrile aquagel. Generally, the method includes the steps of preparing a solution of polyacrylonitrile by dissolving the polyacrylonitrile in a water-miscible solvent which is capable of dissolving the polyacrylonitrile but incapable of hydrolyzing the nitrile groups of the polyacrylonitrile under the dissolution conditions. Coagulating the polyacrylonitrile solution by replacing the solvent with a coagulating fluid such as water or a water-miscible fluid incapable of dissolving polyacrylonitrile at temperatures below 80° C. and incapable of reacting with the nitrile groups of the polyacrylonitrile, thus obtaining the polymer in the aquagel state. Replacing the coagulating fluid with a fluid reagent capable of reacting with the nitrile groups of the polyacrylonitrile aquagel but incapable of dissolving the polyacrylonitrile aquagel at the selected reaction temperature. Allowing the fluid reagent to chemically react with the nitrile groups of the aquagel while the polyacrylonitrile aquagel is undissolved to form a copolymer product.

The copolymer product is then either used in further chemical reactions involving newly formed and/or original side substituents, or isolated and utilized for molding or shaping into various articles. Various plasticizers, which when undiluted are capable of dissolving polyacrylonitrile, may be added to the copolymer product to assist in molding or shaping the material into an article.

68 Claims, 2 Drawing Sheets

U.S. PATENT DOCUMENTS

| | | | |
|---|---|---|---|
| 3,864,323 | 2/1975 | Stoy | 260/88.7 |
| 3,895,169 | 5/1975 | Wichtele | 428/420 |
| 3,897,382 | 7/1975 | Stoy et al. | 260/29.6 |
| 3,926,930 | 12/1975 | Ohfuka et al. | 260/85.5 |
| 3,948,870 | 4/1976 | Stoy et al. | 260/85.5 |
| 3,964,973 | 6/1976 | Hradil et al. | 195/68 |
| 3,970,718 | 7/1976 | Takahashi et al. | 260/876 R |
| 3,975,478 | 8/1976 | Leonard | 264/41 |
| 4,107,049 | 8/1978 | Sano et al. | 210/490 |
| 4,107,121 | 8/1978 | Stoy | 260/29.6 |
| 4,123,406 | 10/1978 | Stoy et al. | 260/29.6 |
| 4,147,745 | 4/1978 | Sano et al. | 264/22 |
| 4,172,823 | 10/1979 | Stoy et al. | 260/29.6 AN |
| 4,183,884 | 1/1980 | Wichterle et al. | 264/41 |
| 4,228,056 | 10/1980 | Stoy | 260/29.6 |
| 4,265,959 | 5/1981 | Sano et al. | 428/216 |
| 4,268,662 | 5/1981 | Sano et al. | 528/486 |
| 4,272,378 | 5/1981 | Sano et al. | |
| 4,272,422 | 6/1981 | Tanaka | 260/29.6 |
| 4,331,783 | 5/1982 | Stoy | 525/294 |
| 4,337,327 | 6/1982 | Stoy | 525/280 |
| 4,366,206 | 12/1982 | Tanaka | 428/373 |
| 4,369,294 | 1/1983 | Stoy | 525/340 |
| 4,370,451 | 1/1983 | Stoy | 525/294 |
| 4,379,874 | 4/1983 | Stoy | 524/27 |
| 4,379,879 | 4/1983 | Okada et al. | 524/186 |
| 4,420,589 | 12/1983 | Stoy | 525/93 |
| 4,423,099 | 12/1983 | Mueller et al. | 428/35 |
| 4,468,499 | 8/1984 | Siegfried et al. | 525/301 |
| 4,480,642 | 11/1984 | Stoy et al. | 128/341 |

METHOD FOR PREPARING POLYACRYLONITRILE COPOLYMERS BY HETEROGENEOUS REACTION OF POLYACRYLONITRILE AQUAGEL

BACKGROUND OF THE INVENTION

1. Field of the Invention

This invention pertains to methods for producing polyacrylonitrile derivatives by a controlled heterogeneous reaction.

2. Background of the Related Art

Copolymers containing predominantly acrylonitrile units have been synthesized for a number of purposes. For example, to improve the reception of dyes of acrylic fibers, to improve polyacrylonitrile (PAN) membrane characteristics, and to produce water-absorptive or water-soluble polymers.

Certain products of PAN reactions are known to have sequential block compositions, so that the residual nitrile groups are organized in continuous sequences, as are the groups resulting from the respective reaction of the nitrile groups. The average length of such sequences or blocks is larger than the length of sequences corresponding to random group distribution at the same reaction conversion. This is due to the so-called "zipper mechanism," in which a newly formed group activates neighboring nitrile groups. While the reaction starts on randomly selected nitrile groups, once new groups are formed, any additional new groups are more likely to be formed in the vicinity of previously formed groups so that the sequence of newly formed groups grows gradually, resembling a "zipper opening". The result of such a reaction is a block copolymer with continuous sequences or blocks of the original nitrile groups and newly formed groups (e.g. amides). Because each polymer contains a multitude of blocks of each kind, the product is called a "multiblock copolymer" (MBC). The process for forming a MBC and the general characteristics of MBC's have been described in articles by various authors, for example, N. A. Plate, et al., in the Journal of Polymer Science, Vol. 12, 2165–2185 (1974).

Prior to this invention, the only known method for producing MBC's of PAN was by hydrolysis of homogeneous solutions of PAN, in the presence of either an acid or a base catalyst, to yield PAN-acrylamide or PANacrylic acid MBC's, respectively. A "homogeneous" solution of PAN is a solution in which the PAN polymer chains are fully solvated by a "good" PAN solvent, i.e. a solvent whose Flory-Huggins $\xi$ factor is less than 0.5, so that all chains are equally accessible to the solvent. Other solution reactions of PAN, i.e. Radyszewski or Ritter reactions, as described by V. Janout, Ph.D. Thesis, Institute of Macromolecular Chemistry, Prague, C.S.S.R. (1978), only yield random copolymers.

Homogeneous hydrolysis reactions of PAN were first described by Polson in U.S. Pat. No. 2,579,451 in 1951, again in U.S. Pat. Nos. 2,721,133, 3,368,015 and 3,926,930 by Downing, et al, Irion, et al and Olijuka, et al, respectively. However, none of these inventors realized that the reaction product was a MBC.

In most cases, highly concentrated acid is used as both the PAN solvent and catalyst. Stoy, et al in U.S. Pat. No. 3,897,382 disclosed that improved control of hydrolysis of PAN in acids results where the hydrolysis reaction is first run at elevated temperatures to generate some randomly distributed amidic groups, and then finished at low temperatures to generate continuous sequences. Initiating amidic groups have also been incorporated into starting PAN by copolymerization, see also U.S. Pat. No. 3,948,870 issued to Stoy, et al.

Alkaline-catalyzed solution hydrolysis is described by Stoy in U.S. Pat. No. 4,017,121 where PAN is dissolved in a concentrated aqueous solution of NaSCN and then hydrolyzed in the presence of a basic catalyst, such as sodium hydroxide. This reaction leads predominantly to acrylonitrile-acrylic acid multiblock copolymers. By contrast, acid-catalyzed hydrolysis of PAN predominantly yields acrylonitrile-acrylamide copolymers.

In the presence of certain catalysts, PAN hydrolysis in solution causes primarily formed amidic groups to form glutaramide groups by condensation of neighboring amides, as described by Stoy in U.S. Pat. Nos. 4,331,783 and 4,369,289. As further described in detail by Stoy in U.S. Pat. Nos. 4,370,451 and 4,337,327, the resulting copolymers with glutaramide sequences can then be converted by variety of known reactions into new block copolymers which cannot be prepared by direct hydrolysis.

Hydrolysis of PAN dissolved in acids is also described in non-patent literature, such as, C. W. Saltonstall, et al., R&D Progress Report #220, Department of Interior (November, 1966); Soler J. Baldrian, and J. Angew, Macromol Chem. 49, 49 (1976); Janacek, et al., J. Polymer Sci., Symposium No. 53, 2SS (1975); and Lovy, J., et al., Coll. Czech, Chem. Commun., 506 Vol. 49 (1984). Eventually, investigators gradually recognized that such PAN hydrolysis reactions yield multiblock acrylonitrile copolymers.

An alternative method of homogeneous acidic hydrolysis of PAN using covalently cross-linked PAN gels swollen with acidified $ZnCl_2$ or $HNO_3$ is described by Stoy and Stoy, et al., respectively, in U.S. Pat. Nos. 4,123,406 and 4,228,056. From the viewpoint of hydrolysis kinetics and mechanism, there is no substantial difference between an acid solution of PAN and cross-linked PAN swollen in the same acid. All nitrile groups are similarly accessible and solvated, regardless of the presence of infrequent chemical links between polymer chains. This is why the term "homogeneous hydrolysis" covers both solutions of PAN and cross-linked PAN swollen in reactive solvents of PAN.

Homogeneous acidic hydrolysis of PAN can also be carried out in a mixture of both dissolved (i.e. reactive) and undissolved (i.e. inert) PAN. This reaction was described by Stoy in U.S. Pat. Nos. 3,864,323 and 4,379,874 as "heterogeneous". However, such hydrolysis is "heterogeneous" only in the sense that various fractions of PAN start hydrolysis at different times so that the product is heterogeneous with a broad or bimodal distribution of conversions per chain. From the viewpoint of the hydrolytic reaction, it is again carried out in solutions, i.e., in a state of full solvation of reacting nitrile groups.

A heterogeneous process in the true sense of the word is where solid PAN is dispersed in the reaction medium, and the reaction is carried out in the absence of PAN solvents. In most cases, the reaction is the basecatalyzed hydrolysis of solid PAN. The product of such hydrolysis can either be water-soluble acrylic-acrylamide copolymers (see e.g., U.S. Pat. Nos. 2,812,317, 2,861,059 and 3,200,102 issued to Barret, Mow and Kleine, respectively), or cross-linked water swellable particles or fibers (see, e.g., U.S. Pat. Nos. 4,272,422 and 4,366,206 issued to Tanaka). In the case of the water-soluble products, they dissolve as they form to expose fresh unreacted PAN surfaces.

Alkaline hydrolysis of nitrile groups can also be carried out on the surface of densely cross-linked copolymers as described by Hradil, et al., in U.S. Pat. No. 3,964,973.

Acid-catalyzed heterogeneous reactions of PAN are much less common and are usually carried out only on the PAN surface, for instance, by reaction with sulphuric acid to introduce sulfo-and sulfate groups while simultaneously stabilizing the surface layer by crosslinking, see U.S. Pat. No. 3,895,169 issued to Wichterle. Another surface reaction on solid dry PAN is the sulfonation by gaseous S03 as described by Takezo, et al., U.S. Pat. No. 4,265,959, or the plasma-activated surface oxidation used to produce semi-permeable membranes, as described by Takezo, et al. in U.S. Pat. No. 4,107,049. However, none of these reactions yields multiblock copolymers, except perhaps in an extremely thin and inseparable surface layer. Attempts at heterogeneous acidic hydrolysis which could provide multiblock hydrolyzates have been unsuccessful, see C. W. Saltstall, et al supra.

Accordingly, prior to this invention, only acidcatalyzed hydrolysis of PAN carried out in the presence of a reactive PAN solvent was known to yield PAN multiblock copolymers, whether cross-linked or non cross-linked and whether in pure form or as composites with PAN.

Other multiblock derivatives of PAN have been prepared indirectly, i.e., by conversion of primary acrylonitrile-acrylamide multiblock copolymers formed by homogeneous acid-catalyzed hydrolysis. Such copolymers are recognizable by the distribution of functional groups reflecting the structure of the parent glutaramide copolymer. Examples of processes for indirect preparation of PAN derived MBC's, include: methods using amide cyclization to form glutarimide derivatives which are subsequently cleaved, as described by Stoy in U.S. Pat. Nos. 4,331,783 and 4,369,289; alkaline treatment of products of acid-catalyzed hydrolysis, as described by Stoy in U.S. Pat. Nos. 4,337,327 and 4,370,451; Bouvault reaction between amide groups and nitrous acid in acrylonitrile-acrylamide multiblock copolymers, as described in U.S. Pat. Nos. 4,123,406 and 4,480,642 issued to Stoy and Stoy, et al., respectively; and, surface sulfonation or sulphatation of amides while simultaneously cross-linking the product by using, for example, glycerol, as described by Wichterle, et al., in U.S. Pat. No. 4,183,884.

The structure of PAN in the solid state is very different from most polymers. One major difference is that solid-state PAN is fully crystalline: absent is an amorphous phase, which always coexists with the crystalline phase in other polymers The second major difference is that in stretched or oriented PAN the crystalline phase is organized perpendicular to the stress vector, while very little or no order is detectable in the direction of stress. The third major difference is that PAN crystallizes to the same extent and with the same morphology regardless of tacticity See, Bohn, C. R., et al., J. Polymer Sci. 55, 531 (1961) for a detailed description of the structural features of PAN in the solid state.

PAN is an excellent barrier to the diffusion of low molecular weight compounds, due to its very high crystallinity and the absence of an amorphous phase. Also, all (or nearly all) of the strongly dipolar nitrile groups of PAN are incorporated in the crystalline matrix. Accordingly, solid PAN is very reluctant to engage in a chemical reaction unless it is in the presence of a PAN solvent. This high crystallinity and the very low permeability of PAN to reagents explains why PAN reacts mostly in the presence of solvents which dissolve its crystalline phase. It is also the reason why solid state PAN only reacts with bases to form water soluable or cross-linked products. Namely, such a reaction has to proceed in a layer-by-layer fashion allowing the reacted portions to be dissolved, unless the polymer is covalently cross-linked.

Prior to this invention, only two reactive states of PAN were contemplated, namely, the solid state where all reactive groups are bound within a dense crystalline matrix, and the dissolved or plasticized gel state where the crystalline phase has been broken down by the solvation of nitrile groups in a solvent of PAN.

A third state has been known, but it has never been closely studied or contemplated as a special reactive state of PAN. This third state is hereinafter referred to as the "aquagel" state or "AQG". The AQG is a metastable structure in which PAN contains water or another liquid. However, AQG is not PAN swollen to equilibrium, rather, decrease in the liquid content of PAN AQG is irreversible. There are substantial differences in the properties of the AQG state of PAN from the solid state crystalline, or the dissolved or plasticized gel state of PAN.

The present invention is based on the special properties of the PAN aquagel state. However, since the PAN aquagel state has not been satisfactorily studied or described prior to this invention, we have included the following description of the properties of the PAN aquagel state and cited the references we consider pertinent.

Some investigators have observed that PAN solutions in water-miscible solvents can be coagulated by contact with water. The coagulation is, in fact, precipitation of PAN in the solid form by exchanging a "good" PAN solvent, i.e., a solvent having a Flory-Huggins factor <0.5 and capable of fully solvating the PAN chains for a "poor" PAN solvent, i.e., a solvent having a Flory-Huggins factor >0.5 and incapable of fully solvating the PAN chains (e.g., water or mixtures of the good solvents with water). These good PAN solvents include several inorganic compounds in concentrated aqueous solution, including calcium thiocyanate, sodium thiocyanate, zinc chloride, lithium bromide, magnesium perchlorate, phosphoric acid and nitric acid. Also, several organic compounds in substantially anhydrous solutions are good PAN solvents, including dimethylsulfoxide, dimethylformamide, gamma-butyrolactone, tetramethylenesulfone and dimethylacetamide. Alternatively, other water miscible fluids, such as low aliphilic alcohols containing one to four carbon atoms per molecule, and the like, which are incapable of dissolving PAN can be used to coagulate PAN. By a "fluid" we mean either a liquid or a gas. The coagulation process is used in the wet spinning of acrylic fibers and in the casting PAN membranes, where coagulation is often preceded by partial evaporation of the solvent to create a surface "skin".

Coagulation is a complicated physical process involving diffusion of water or another coagulant into the PAN solution, and diffusion of the PAN solvent out of the solution. As the solvent's thermodynamic ability to hold PAN in solution deteriorates, due to the increasing water content, PAN precipitates into a new solid phase. The new PAN solid phase hinders the diffusion of all permeants. Because water permeates into the precipitating polymer faster than the solvent diffuses out, a number of small osmotic cells are formed having precipitated PAN polymer walls. The result is a heterogeneous, porous or microporous composition formed by the precipitated PAN polymer matrix with voids or pores filled with water. Because the differences between the diffusion rates of water and the solvent increases with increasing length of the diffusion path, a skin is formed on the surface of the coagulated article which is usually less heterogeneous and porous than the interior "bulk" of the coagulated article. This skin formation is used in the production of membranes with asymmetric structures in which the porous bulk provides high flow rates while the denser skin provides for separation of permeants by their diffusion rates, or by the size of their molecules in solution which is related to their diffusion coefficients.

Processes for producing semi-permeable PAN membranes are described in U.S. Pat. Nos. 4,272,378, 4,147,745, 4,265,959, 4,107,049, 3,975,478, and 4,268,662. However, probably because the investigators looking at membranes were interested in creating porous structures, the coagulated PAN polymers described in these membrane related patents were thought of as any other porous articles, in which the pore walls were composed of PAN. These investigators never contemplated or attempted to explain the structure and character of the solid-phase PAN product in these structures. The differences in permeabilities and flow rates were explained in terms of water-filled pores of varying size distribution. There is nothing in the aforesaid patents which either teaches or suggests that the structure and properties of the coagulated PAN would differ from the structure and properties of PAN in a homogeneous article, such as an acrylic fiber or a dry membrane cast without coagulation, for instance by evaporation of the PAN solvent.

A PAN article prepared by coagulation with subsequent drying has the same polymer properties including, Tg, crystallographic structure, thermodynamic properties, etc., as the article made by solvent evaporation, e.g., solvent cast membrane or dry-spun fiber. Both articles are non-melting, non-swellable in water, and orientable by stretching at high temperatures. In each case PAN acts as an excellent barrier to the diffusion of low-molecular weight solutes, because it is only soluble in a few highly polar solvents, and is laterally organized in the oriented state.

When the coagulation process has been used in fiber-spinning to prepare fibers without macroscopic pores, the coagulated PAN product has been referred to as an "Aquagel". The coagulated fiber cannot have microscopic pores, since it must be stretched to orient the polymer chains, to strengthen the fiber. Aquagels are described as made from solutions of polymers or copolymers of acrylonitrile containing at least 85% acrylonitrile units in aqueous concentrated solutions of certain salts such as zinc chloride or sodium thiocyanate. If such solutions are spun into ice-cold water at temperatures not exceeding about 2° C., the obtained "Aquagel" filament can be easily drawn in hot water, forming a good, strong acrylic fiber. See, for example, U.S Pat. Nos. 2,558,730 to 2,558,735 issued to Cresswell, et al. Under these conditions a gelled fiber without macroscopic pores is formed. This fiber contains a certain amount of water, and can be easily stretched in hot water prior to drying. Stanton, et al. in U.S. Pat. No. 2,790,700 describe a process in which the fiber's heterogenicity is suppressed by coagulation in a dilute PAN solvent. In Stanton, et al's methods, the solvent gradient is lowered slowing down the rate of coagulation so that osmotic pore formation is suppressed.

Cummings, Jr. in U.S. Pat. No. 2,948,581 describes a similar fiber coagulation process using thiocyanate instead of zinc chloride as the PAN solvent. It is believed that the gelled state and easy stretching reported by Cummings, Jr. is due to residual thiocyanate solvent in the gelled fiber which plasticizes the polymer to a limited extent. After stretching, the fiber is washed removing the residual thiocyanate solvent. Likewise, U.S. Pat. No. 3,689,621 issued to Fuji, et al. describes the process of coagulation of PAN to an aquagel from a zinc chloride solution. The process is modified by combined cold and hot stretching in the aquagel and dried states.

Fukisaki, et al. in U.S. Pat. Nos. 3,073,669 and 3,080,209 describe the process of dissolving PAN in concentrated nitric acid and the coagulation of PAN fibers in dilute nitric acid solution. The process includes the steps of wet fiber spinning and fiber stretching prior to drying. Also, U.S. Pat. No. 3,080,209 includes the addition of univalent cations to the coagulation bath to improve the dyeability of PAN fibers when using basic dyestuffs. The diffusion of water-soluble compounds such as dyestuffs into the PAN is much higher before drying than after the PAN aquagel has been dried. In addition, the high permeability cannot be restored once PAN has been dried. At the time the Fujisaki, et al patents were published, the accepted explanation for the properties of PAN AQG was that the aquagel state is a metastable state in which PAN crystallization gradually takes place, as the water content gradually decreases. In addition, it was assumed that the aquagel state is simply a state in which there are very small water filled voids in the PAN structure. It is believed that these voids irreversibly collapse by drying or by evaporation over an extended period of time as residual solvent is removed.

In addition, coagulation of PAN solution can be achieved by non-aqueous fluids which are miscible with water, such as lower aliphatic alcohols or glycols, which are subsequently replaced with water, see, C. W. Saltonstall, et al.: *Research and Development of New Polymer System for Reverse Osmosis Membranes:* R&D Progress Report #167, Department of Interior (February, 1966) and Ibid. R&D Progress Report #220 (November, 1966).

The aquagel state of PAN is also referred to as a gelled state, gel or hydrogel. However, by definition an aquagel is not a hydrogel, since a hydrogel swells reversibly in water, while an aquagel cannot regain its water content once it is dried. The structure and properties of the aquagel state have never been thoroughly studied prior to this invention although, as demonstrated above, it has practical utility. To date, aquagel is considered microporous or ultra microporous polyacrylonitrile. The term "aquagel", prior to this invention, referred without exception to clear translucent PAN coagulates. While PAN coagulates with permanently visible pores were merely deemed to be porous PAN.

The aquagel state of PAN can be discerned from plain porous dried PAN by immersing a sample into an aqueous solution of a dyestuff such as methylene blue. Aquagel is rapidly stained and the hue remains intact when the sample is dried. The coloration cannot be removed by washing in cold water. By contrast, the plain porous dried PAN does not become stained, and any dyestuff, caught perhaps at the surface, can easily be washed off in cold water.

The aforementioned references emphasized that very specific and narrow coagulation conditions are necessary to obtain PAN in the aquagel state. These references also teach that coagulation of PAN under conditions outside those very narrow limits results in porous PAN.

However, contrary to the accepted teachings in the art, discussed above, we have found that the "aquagel" state of PAN is not only formed in the narrow range of conditions previously believed necessary, but rather over a very broad range of conditions which exist during the replacement of any PAN solvent for water. Furthermore, the porosity observed under most coagulation conditions does not appear to be directly related to presence or absence of the aquagel state.

An important indication that aquagel is not merely simple microporous PAN, as was previously thought, is that the plasticizing effect is observed with the nonpolar, water-immiscible liquids such as hexane, toluene, silicone oil, poly (propylenoxide), mineral oil, chlorinated hydrocarbons, organic phtalates and phosphates, as well as with polar, water-miscible liquids, such as dimethylsulfoxide, dimethylformamide, gammabutyrolactone, tetramethylene, sulfone, dimethylacetamide, glycerol and 1,2-propylene glycol, and many others. This shows that aquagel is a peculiar state of the PAN polymer which is neither swollen, nor simply microporous with the pores filled with a liquid phase. If aquagel were merely simple microporous PAN and if aquagel were swollen, then the swelling should be dependent on thermodynamic parameters of the liquid, such as solubility parameters or cohesion energy. This is clearly not the case, rather, aquagels retain their volume irrespective of the character of the liquid. Also, if aquagels were porous structures, then there would be no plasticizing effect by the liquids, which are all poor solvents of PAN with a Flory-Huggins $\xi$ factor $>0.5$. Finally, if aquagels were a porous structure with very small pores filled with liquids, they would have a large wetting angle making them thermodynamically unstable, which is clearly not the case.

Contrary to accepted teachings in the art, we have found that aquagels made with both water-miscible and water immiscible liquids are stable and stay plasticized over very long periods of time without any change in their properties. Aquagels retain their stability as long as the liquid is not removed, e.g., by evaporation. Accordingly, the plasticizing effects of water-immiscible liquids on polyacrylonitrile having the structure acquired in the "aquagel" state are very surprising and cannot be satisfactorily explained by the current theoretical concepts of polymer swelling, or of porous, glassy polymers.

SUMMARY OF THE INVENTION

This invention relates to a method for preparing acrylonitrile copolymers. This method includes the following steps:

1. Preparing a solution of polyacrylonitrile by dissolving the polyacrylonitrile in a water-miscible solvent which is capable of dissolving the polyacrylonitrile but incapable of hydrolyzing the nitrile groups of the polyacrylonitrile under the dissolution conditions.

2. Coagulating the polyacrylonitrile solution by replacing the solvent with a coagulating fluid such as water or a water-miscible fluid incapable of dissolving polyacrylonitrile at temperatures below 80° C. and incapable of reacting with the nitrile groups of the polyacrylonitrile, thus obtaining the polymer in the aquagel state.

3. Replacing the coagulating fluid with a fluid reagent capable of reacting with the nitrile groups of the polyacrylonitrile aquagel but incapable of dissolving the polyacrylonitrile aquagel at the selected reaction temperature.

4. Allowing the fluid reagent to chemically react with the nitrile groups of the aquagel while the polyacrylonitrile aquagel is undissolved to form a copolymer product.

The copolymer product is then either used in further chemical reactions involving newly formed and/or original side substituents, or isolated and utilized for molding or shaping into various articles. Various plasticizers, which when undiluted are capable of dissolving polyacrylonitrile, may be added to the copolymer product to assist in molding or shaping the material into an article. These plasticizers include polar, water-miscible liquids such as dimethylsulfoxide, dimethyleformamide, gamma-butyrolactone, tetramethylene, sulfone, dimethylacetamide, glycerol and 1,2-propylene glycol, and many others. "Polyacrylonitrile" includes by definition homopolymers of acrylonitrile, and polyacrylonitrile copolymers including random, block and multiblock copolymers having at least 85% mol. acrylonitrile units. By the polyacrylonitrile aquagel being "undissolved" during the reaction it is meant that the polyacrylonitrile aquagel is not fully solvated by the fluid reagent during the reaction, the PAN aquagel may be swollen and/or plasticized during the reaction.

One variation of the preferred method includes the preparation of the polyacrylonitrile aquagel according to the following steps:

1. Preparing a polymer solution containing predominantly acrylonitrile units by dissolving the polymer in a water-miscible solvent which when undiluted is capable of dissolving the polymer but is incapable of reacting with the nitrile groups of the polymer.

2. Partially coagulating the polymer solution to a gel by changing the physical conditions of the solution. For example, by decreasing the temperature or pressure of the solvent below the point of gelation or by absorption of humidity or vapors from the surrounding medium.

3. Fully coagulating the gelled polymer solution by replacing all of the solvent with a nonsolvent of the polymer to form the PAN aquagel.

Another variation of this invention is a method for preparing a shaped, chemically modified acrylonitrile polymer article capable of being re-formed into a second shape. This method includes the following steps:

1. Preparing a solution of the polymer by dissolving the polymer in a water-miscible solvent capable of dissolving the polymer but incapable of reacting with its nitrile groups.

2. Coagulating the polymer solution by replacing the solvent with a coagulating fluid, such as water or a water-miscible fluid which is incapable of dissolving the polymer and incapable of reacting with the polymer's nitrile groups.

3. Forming the coagulated polymer into a first shape.

4. Replacing the coagulating fluid with a fluid reagent capable of reacting with the polymer's nitrile groups but incapable of dissolving the polymer at the selected reaction temperature while maintaining the first shape.

5. Allowing the reaction solution to chemically react with the nitrile groups while the polymer is undissolved to form the shaped copolymer article.

The acrylonitrile copolymer is preferably prepared as a shaped article, e.g., a pellet, tube, ribbon, film, membrane, fiber, hollow fiber, sheet or lens, and then if desired, it is subsequently processed to form a second shaped article, e.g., a catheter, membrane, tube, hollow fiber or a lens.

We have found that not only clear, homogeneous aquagels known for fiber production have the abovedescribed properties, but also heterogeneous and porous coagulates formed by coagulation of PAN dissolved in organic and inorganic solvents, such as DMSO, DMF, gammabutyrolactone, cyclic ethylene carbonate, concentrated acid or base aqueous solutions and similar solvents of PAN. It appears, therefore, that the "aquagel" state of PAN is formed not only in the narrow range of conditions described hitherto, but quite generally during the replacement of any PAN solvent for water or a water-miscible polar liquid, e.g., methanol, during the coagulation process.

Although many solvents are suitable for the production of aquagel under a broad range of conditions, not all combinations of solvent-coagulation conditions and polymer concentrations are equally as suitable. The preferred combinations of solvent-coagulation conditions and polymer concentrations are those yielding the most homogeneous aquagel and the thinnest possible surface "skin" of dense polymer.

The preferred conditions include the following combinations:

(1) Solvents made from an aqueous solution of an inorganic salt, such as zinc chloride, alkali metal or calcium thiocyanate, or an inorganic acid such as nitric acid, phosphoric acid or sulfuric acid. These inorganic aqueous solvents are preferred over organic polyacrylonitrile solvents.

(2) A high concentration of polyacrylonitrile in the solution, preferrable between about 7.5% to about 60%, and more preferrable between about 10–15% and 40%.

(3) A low temperature coagulation bath, preferrable below about 25° C., and more preferrable below about 18° C.

(4) A coagulating fluid containing the solvent used in preparation of the aquagel, but at a concentration which is lower than the concentration necessary to dissolve the polyacrylonitrile and higher than about 0.25%, and preferrably higher than 2.5% by weight.

(5) The solidification of the polyacrylonitrile solution should begin prior to its contact with coagulating fluid, by lowering its temperature and/or by allowing the polyacrylonitrile solution to absorb vapors of a non-solvent of polyacrylonitrile, such as water or an alcohol. This measure is particularly preferred for aquagels prepared with organic solvents, such as dimethylsulfoxide, dimethylformamide, ethylene carbonate and the like. In contrast to methods which use homogeneous reactions, it is not necessary to use and recover large amounts of reactants, e.g., an acid. A wide range of fluid reagents can be used because the reagent does not have to contain PAN solvents. In addition, suspension reactors, rather than more expensive solution reactors, can be used to prepare the acrylonitrile containing copolymers. Therefore, a large variety of PAN reaction products can be easily and economically produced. In contrast to methods utilizing base-catalyzed heterogeneous reactions of solid crystalline PAN, the Heterogeneous reaction of Pan aquagel is not limited to the PAN surface, instead, conversion extends throughout the bulk of the material.

Unlike cross-linked PAN gels, the PAN aquagels of this invention can be processed as thermoplastics. Thus, an article can be formed into a first shape, processed, and then re-formed into a second shape. For example, the PAN aquagel can be provided initially in the form of tubing. It can then be converted into a PAN multi-block copolymer, e.g., by acid hydrolysis, while still maintaining its tubular shape. The tubing can then be processed further with a variety of thermoplastic processing techniques into a finished article, such as a catheter. Thus the present invention allows for the preparation of articles having complex shapes or shaped parts. Cross-linked gels, on the other hand, must be polymerized and simultaneously formed into their final shape, because following cross-linking they become thermoset resins. Therefore, such processing of crosslinked gels generally has not been used because it is very complex, inflexible and expensive. Thus, this invention provides greater processing flexibility at lower costs.

Still another advantage of this process is that it enables us to directly prepare composites of polyacrylonitrile and multiblock copolymers of acrylonitrile and polyacrylonitrile, described in U.S. Pat. No. 4,379,874. Accordingly, this invention provides a simple economical method for preparing acrylonitrile copolymers. When PAN aquagel is initially formed, it is amorphous. Due to such conditions as heat treatment, aging and drying of the PAN aquagel, crystalline domains form within the amorphous PAN aquagel. The amorphous PAN reacts faster than the crystalline domains in the aquagel. Accordingly, the reaction of PAN aquagel containing both amorphous and crystalline domains can be reacted directly to form composites of polyacrylonitrile and multiblock copolymers of acrylonitrile and polyacrylonitrile.

Another advantage of this invention is that it provides long blocks after relatively short reaction times. Long blocks are desirable because they lead to improved mechanical and thermal properties. With homogeneous processes it is necessary to decrease the reaction rate (and hence increase the reaction time) or increase the polymer concentration in order to increase block length. The ability to increase polymer concentration, however, is limited by practical processing considerations such as high viscosity or insolubility of the polymer in acrylonitrile.

Other features and advantages of the invention will be apparent from the following description of the preferred embodiments thereof, and from the claims.

DESCRIPTION OF THE PREFERRED EMBODIMENTS

Figure 1:
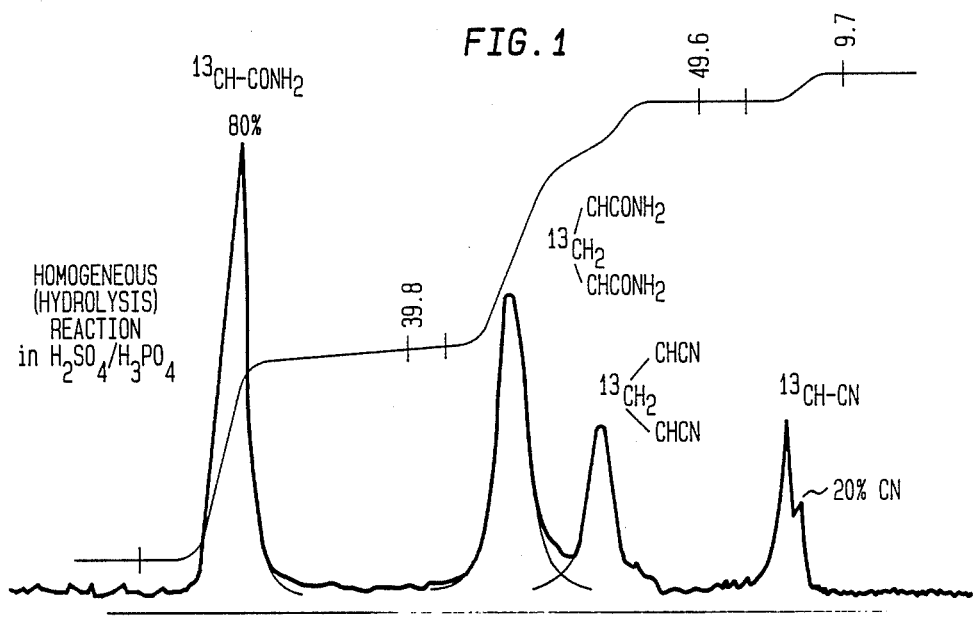
FIG. 1 shows the $^{13}$C-NMR spectra of the $CH_2$ and CH region in the PAN copolymer prepared by homogenous hydrolysis of PAN in a mixture of $H_2SO_4$ and $H_3PO_4$, according to the prior art. The product of the hydrolysis was measured as a 10% (w/w) solution in a 65% aqueous solution of NaSCN. The $^{13}$C-NMR spectra graphically shows that glutarimide groups are not present in the reaction product.

We have discovered that polyacrylonitrile in the aquagel state reacts much more readily with a number of low molecular weight co-reagents, than does crystalline solid state PAN. PAN in the aquagel state reacts with these co-reagents to form copolymers of acrylonitrile with derivatives of acrylic acid, such as amides, salts, esters, hydrazides, and hydroxamic acids. The reaction of PAN in the aquagel state shall hereinafter be referred to as the "Heterogeneous reaction". This discovery also holds true for other copolymers which predominately contain acrylonitrile units. By contrast, under similar reaction conditions, solid-state, crystalline PAN reacts slowly or not at all. Solid-state, crystalline PAN reacts primarily on the PAN surface, or etches the crystalline PAN in a layer-by-layer fashion. The term "Aquagel" as used herein broadly refers to PAN prepared by coagulating PAN solutions in water or water miscible fluids that are incapable of dissolving PAN, and to the compositions which result from the replacement of the coagulation fluid by other non-solvents of PAN.

We have found that the Heterogeneous reaction products are not random copolymers. Rather these Heterogeneous reaction products are multiblock copolymers with acrylonitrile sequences that are longer than the acrylonitrile sequences which would result from a random attack of the reagent. More specifically, in the Heterogeneous reaction, PAN aquagels react with mixtures of a catalyst and/or co-reagent, capable of reacting with nitrile groups but incapable of dissolving polyacrylonitrile, to yield very unique copolymer products. The copolymer products contain continuous sequences of residual nitrile groups which are organized into crystalline domains, and continuous sequences of derivatives of acrylic acid which are organized into amorphous domains.

If the acrylic acid derivatives are hydrophilic, then the amorphous domains, and, therefore, the copolymer products are swellable in water. Since the Heterogeneous reaction is carried out with PAN in the aquagel state, the PAN AQG can enter into the reaction in a particular shape, such as a fiber, hollow fiber, tubing, pellet, rod, strip, flat sheet, bead or regular or irregular particle. Furthermore, because the polyacrylonitrile AQG is undissolved before and during the Heterogeneous reaction, the resulting product is in the same shape as the original PAN aquagel, although it may change in size. This is in contrast to the prior art methods in which PAN and/or the reaction products are dissolved.

A broad range of co-reagents and/or catalyst are suitable for the Heterogeneous reaction, being limited only by their capability to react with the nitrile groups without dissolving the polyacrylonitrile.

One co-reagent which is suitable for preparing a solution with the acid or base catalyst is water, which hydrolyzes PAN to acrylamide and/or acrylate, depending on the catalyst used. Other suitable co-reagents for preparing a solution with the acid or base catalyst include lower aliphatic alcohols with 1-4 carbon atoms and glycols having 2-4 carbon atoms. Suitable acidic catalysts include solutions of inorganic acids, such as aqueous sulphuric acid, solutions in concentrations up to about 70%; aqueous nitric acid solutions in concentrations up to about 50%; aqueous phosphoric acid solutions in concentrations up to about 90%; aqueous hydrochloric acid solutions in concentrations up to about 37%; Lewis acids such as $ZnCl_2$/HCl mixtures, and dilute aqueous hydrofluoric acid solutions. Strong or medium solutions of organic acids with a pH less than 2 are also suitable, some of which include toluenesulfonic acid, trichloroacetic acid, polyethylene sulfonic acid, or oxalic acid. Suitable basic catalysts include watersoluble hydroxides or carbonates of alkali or alkalineearth metals, ammonia, primary to quaternary amines, pyrridine, morpholine and other conventional basic catalysts. More specifically, these suitable base catalysts include alkali metal hydroxides, alkali metal carbonates, alkaline earth metal hydroxides, aliphatic amines, aliphatic mono-amines, aliphatic di-amines, aliphatic tri-amines, and quaternary alkylammonium hydroxide.

The minimum amount or concentration of the catalyst is not critical per se. We have found that hydrolysis of nitrile groups can be carried out even without the addition of catalyst or copolymer if done at high temperature, such as in an autoclave at temperatures above 120° C. and preferably above 150° C.

Acidic or basic catalysts are used to accelerate the reaction rate and decrease the necessary reaction temperature, time or both. The catalysts are also helpful in controlling the chemical composition of the hydrolyzate, such as the proportion of amidic and carboxylic groups in the hydrophilic sequences. For instance, acidic catalysts at lower temperatures yield nearly pure acrylamide sequences, whereas strong alkali catalysts yield a mixture of a major portion of carboxylate and an amidine and amide mixture. Weakly acidic catalysts, or no catalyst at high temperatures, yield amide/carboxylic acid salt in a molar ratio of about 1:1. Strongly acidic catalysts at high temperatures yield sequences with a major portion of glutaramide derivatives. We have discovered that base catalyzed Heterogeneous reactions yield amidine and/or iimidine amidine groups. Prior to the invention amidine and imidine groups were never observed in PAN hydrolysis products, whether PAN was in solution or in the solid crystalline state. In our opinion, the formation of amidine and/or imidine groups from base catalyzed Heterogeneous reactions is due to the special orientation of the CN groups in the PAN aquagel. The CN groups in the PAN aquagel are oriented in a planar conformation, whereas crystalline PAN is described in the literature as having an imperfect helical conformation.

Since PAN CN groups oriented in a planar conformation are more reactive in reactions with cyclic mechanisms, than crystalline PAN CN groups arranged in an imperfect helical conformation, base catalyzed Heterogeneous reactions of PAN AQG yields amidine and/or imidine groups and their reaction products, while acid-catalyzed reactions preferrably yield imide groups and their reaction products.

Another set of Heterogeneous reactions are the acid-catalyzed reactions of nitrile with alcohol, olefin, ester, or ether. Depending on the exact reaction conditions, such as traces of water, temperature and the nature of the alcohol and/or catalyst, the reaction can take the route of the Ritter reaction to an N-substituted amide, or alcoholysis of nitrile to iminoether with subsequent hydrolysis to ester, or hydrolysis to amide with subsequent alcoholysis to ester. Regardless of the route, the newly formed functional groups, as well as the residual nitrile groups are then organized in continuous sequences.

Examples of other Heterogeneous reactions which can be used to modify PAN in the aquagel state are as follows:

(1) Aminolysis with an alkylamine to N-alkylamide:

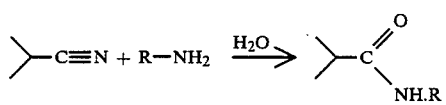

(2) Reactions with mercaptans to iminothioether hydrochloride and then to thioesters:

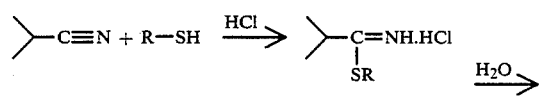

(3) Reactions with dihydrosulfide to thioamide:

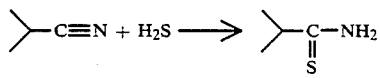

(4) Reactions with azoimide to 5-tetrazole:

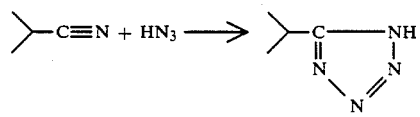

(5) Reactions with hydrazine to hydrazidine:

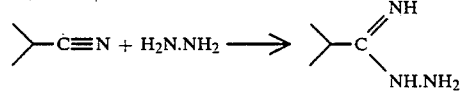

with subsequent condensation to dihydrotetrazine and oxidation to tetrazine:

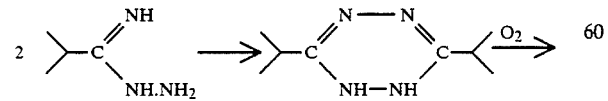

(6) Reactions with hydroxylamine to amidoximes:

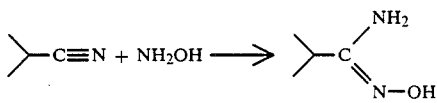

(7) Reactions with secondary amines to amidines:

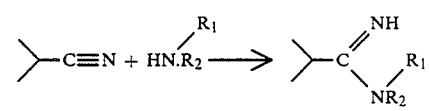

(8) Reaction with ammonia to imidine:

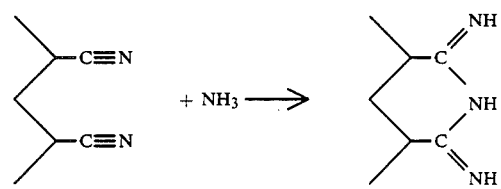

(9) Reaction with 2-aminoethanol to imidazoline:

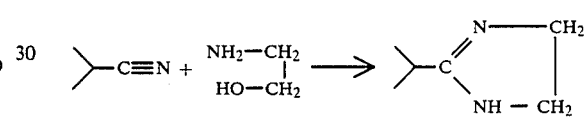

(10) Alkaline hydrolysis to amidine derivatives (besides carboxylic acid and amide groups):

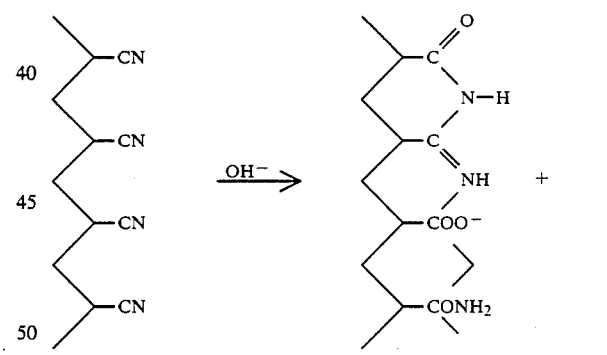

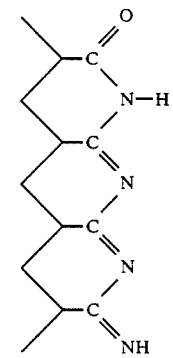

(11) Reaction with hydrazinhydrate to N-aminotriazole:

$2 \rangle\!-\!C\!\equiv\!N + NH_2.NH_2.H_2O \longrightarrow$

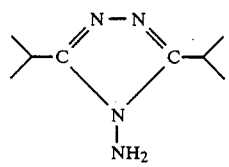

(12) Reaction with alcohols to iminoether hydrochloride:

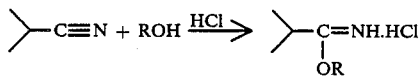

with subsequent hydrolysis to ester:

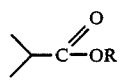

or thermal decomposition to amide:

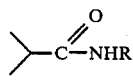

to name a few of the reactions of the nitrile group. R, $R_1$ and $R_2$, independently, are preferably $C_1$-$C_8$ branched or straight chain alkyl groups.

The selection of Heterogeneous reactions suitable for production of multiblock copolymers of acrylonitrile are almost identical to a general list of reactions of nitrile groups, because the water or watermiscible solvent in the aquagel can be replaced by almost any liquid reagent, whether it is polar or nonpolar, water miscible or immiscible, without changing the reactivity of the nitrile group.

The heterogeneous reactions can also be carried out in a very broad temperature range, e.g., between about −5° C. and 200° C., more preferably between +15° C. and 150° C., so that reaction conditions can be adjusted to suit a very broad range of reactions.

The reaction rate depends strongly on temperature, the type and concentration of catalyst, and other typical reaction parameters. Such conditions can be readily established experimentally in specific cases by those skilled in the art.

The Heterogeneous reactions according to our invention are carried out in undissolved PAN aquagel which is highly permeable to reactants. Typically, the reaction conversion is either independent of depth or changes gradually with depth. Multiblock copolymers are present in all layers and display measurable reaction conversion.

The method of our invention can be used to prepare products having substantially identical surface and bulk chemical compositions. The presence of multiblock copolymers throught the Heterogeneous reaction product clearly distinguishes products formed by prior processes which only modified the surface layer of solid-state crystalline PAN. Accordingly, Heterogeneous reaction products can easily be distinguished from products formed by reactions of solid crystalline PAN.

The preferred Heterogeneous reaction of this invention is accomplished according to the following steps:

1. The coagulation fluid, such as water or a water miscible fluid contained in a PAN aquagel article is replaced by diffusion of a fluid reagent. The diffusion is carried out at a temperature which permits the reaction to proceed at a much slower rate than the diffusion of the fluid reagent. The coagulating fluid can be replaced in one or more diffusion steps which may be necessary when the fluid reagent is immiscible with water.

2. PAN aquagel soaked with the fluid reagent is removed from the excess fluid reagent and its temperature is increased to a value at which the reaction proceeds at a desired rate. This step is carried out under conditions in which the fluid reagent or its components cannot escape from the PAN aquagel. These conditions may be achieved in a liquid medium which is immiscible with the fluid reagent and is incapable of dissolving the aquagel, or in a closed container which is saturated with vapors of the volatile components of the fluid reagent. In such a closed container, at any given temperature the partial pressure of a single volatile component of the fluid reagent is the same as the equilibrium partial pressure of the volatile component covering the aquagel. The composition of the fluid reagent, although changing with time and reaction conversion, is therefore essentially homogeneous throughout the PAN aquagel.

3. The reaction is stopped after a predetermined reaction conversion is achieved. The reaction can be stopped by any one or a combination of more than one of the following techniques:
  a. Neutralization or extraction of catalyst;
  b. Lowering the temperature to a value where the reaction rate is negligible;
  c. Extraction or evaporation of the reaction mixture;
  d. Depletion or consumption of one of the reagents, other than the nitrile groups in PAN.

After the reaction is stopped, the finished article can be further washed with water or some other suitable solution, to remove residual reactants, such as the acid or base catalyst.

The last technique for stopping the reaction (d) is particularly advantageous because the desired reaction conversion can be achieved by using a predetermined amount and composition of a particular reagent. The reaction slows down and gradually stops as one reagent is depleted. For example, water in acidic hydrolysis reaction or alcohol in an alcoholysis reaction. According to this preferred technique for stopping the reaction, the nitriles group in the PAN aquagel are in molar excess over one or more co-reagents which are being depleted during the reaction. Stopping the reaction by depletion of one of the co-reagents is better and more certain than in the prior art techniques in which the reaction had to be stopped at an experimentally predetermined time by cooling or neutralization. The prior art techniques could not use depletion of a co-reagent to stop the reaction because PAN was dissolved in a reaction mixture in which water was always in molar excess over the PAN nitrile groups.

This preferred method can be modified to obtain another preferred method in which, unlike step 2, the aquagel is not removed from the excess reagent. Rather, one reagent which is consumed during the reaction is present in an amount which is sufficient for the intended conversion of PAN. The reaction is carried out in an environment where the reaction components can be replenished by diffusion from an outside solution, although the reaction does not have to be controlled by the diffusion.

An example of this preferred process is the base-catalyzed hydrolysis of PAN where water is consumed by addition to nitrile in the first step and by substitution for ammonia in the second step to form copolymer sequences of acrylamide, semi-glutar-imide and acrylic acid. A basic catalyst is necessary to achieve this reaction at lower temperatures. However, the basic catalyst becomes neutralized by acrylic acid carboxyl groups formed by the reaction. Accordingly, the reaction can be stopped once a sufficient number of acrylic acid groups have been formed to neutralize the catalyst, providing that the molar amount of base is substantially lower than the molar amount of the nitrile groups entering the reaction. Specifically, the above reaction practically stops because the ammonia is gradually replaced by ammonium hydroxide which is a much weaker catalyst than ammonia. Because of this neutralization and replacement of the catalyst, an excess of water can be used in the reaction.

The multiblock copolymers formed by the Heterogeneous reaction can be redissolved with a suitable solvent, such as aqueous NaSCN solution or DMSO, and processed into a variety of shapes by conventional processing methods suitable for polymer solutions. Examples of suitable processing methods for copolymer solutions include: casting, dipping, spinning or extrusion. The polymer processing steps can be carried out at ambient or at elevated temperatures.

In a particularly preferred processing method the fluid reagent is replaced by a solvent mixture of good and poor solvents of the PAN copolymer AQG. The mixture is a poor solvent of PAN at ambient temperature, and the poor solvent component of the mixture is more volatile than the good solvent component. Following equilibration of the PAN AQG copolymer with the solvent mixture, the PAN AQG copolymer is taken out of the solvent mixture and the more volatile poor solvent component is removed from the PAN copolymer AQG by evaporation. The relative concentrations of good solvent to poor solvent are predetermined so that the final PAN copolymer-solvent composition in the AQG contains between about 20% to 80% by weight of the copolymer, and advantageously between 35% to 65% by weight of the copolymer. The resulting PAN copolymer-solvent AQG mixture is gelatinous, rubbery or semi-rigid at ambient temperature. The copolymer-solvent mixture can become molten at elevated temperatures, usually above about 100° C., and can be processed to an article by various methods, including extrusion, compression molding, or injection molding. The article is cooled and then extracted with a fluid which is miscible with the good solvent, typically water, to yield a final product.

This processing method is particularly advantageous since it produces final products with better mechanical properties than products that are made by solution processing methods. The final products made by this method so closely resemble products produced by conventional melt processing techniques, such as injection molding, extrusion, etc., that conventional equipment can be used to make these products without any modifications. The semi-finished products which still contain the solvent, are stable, easily handeable, and are ready for additional processing. Additional processing may include, for example, tip-forming of extruded tubing by radiofrequency heating to produce a catheter.

As described herein, the Heterogeneous reactions of polyacrylonitrile aquagels yield different products than analogous reactions of dissolved polyacrylonitrile. There are two basic types of differences:

(a) differences in the chemical composition of the reaction products, and (b) differences in the structure of the resulting copolymer chains as a result of the specific distribution of the functional groups in one chain and the distribution of functional groups, in general, among all chains.

These differences result in substantial variations in the functional properties of the reaction products, even in cases where such differences may appear rather subtle.

We hypothesize that the differences in the chemical compositions reflect different prevailing arrangements of nitrile groups, in the aquagel state in the case of Heterogeneous reactions of PAN aquagels on the one hand, and in the case of Homogeneous reactions of PAN in solution on the other.

While the nitrile groups in PAN aquagels are probably in mostly izotrans/trans and syndio-trans/gauche conformations (i.e. the nitrile groups are in planar conformations), the nitrile groups in polyacrylonitrile solutions are probably mostly in syndio-trans/trans and izo-trans/gauche conformation (i.e. forming an imperfect helix). Therefore, the nitrile groups in aquagels are in an arrangement which is advantageous for reaction with cyclic mechanisms in which either a transition complex and/or a product involves two neighboring nitrile groups which form a six-membered cycle.

Consequently, the reaction products of Heterogeneous PAN aquagel reactions contain higher concentrations of cyclic groups such as
glutarimide

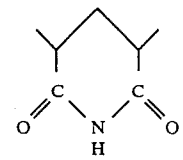

glutarsemiimidine

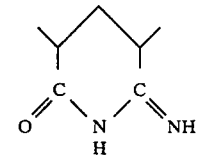

glutarimidine

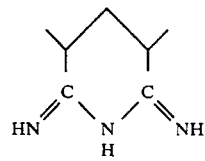

or groups that require cyclic mechanism for their formation, such as amidine

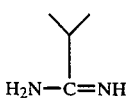

Conversely, Homogeneous PAN solution reactions under otherwise similar reaction conditions yield products in which such cyclic groups are either present in much smaller concentrations or are completely missing.

The planar nitrile group arrangement is also advantageous for forming the new groups in long continuous sequences. We have shown that certain reactions of PAN aquagels yield block copolymers, while the same reactions in polyacrylonitrile solutions yield random copolymers.

Even if the solution reaction yields a block copolymer, such as acid-catalyzed hydrolysis yielding acrylonitrile-acrylamide copolymers in a multiblock arrangement, the analogous Heterogeneous reaction on PAN aquagels yield similar copolymers but with longer sequences of both acrylamide and acrylonitrile groups. Hence, the products of the Heterogeneous PAN aquagel reactions have superior mechanical strength, thermal stability and other important properties.

In addition, the Heterogeneous PAN aquagel and Homogeneous solution reactions yield products with different distribution of newly formed groups both within the chains and among each of the chains.

Because all nitrile groups in dissolved polyacrylonitrile initially have essentially the same reactivity, the distribution of the newly formed groups can be approximated by markovian statistics of the first order. Also, for the same reasons, as long as the polyacrylonitrile has a high enough molecular weight, the concentrations of the newly formed groups in all chains have a rather narrow distribution. This distribution of newly formed groups is always monomodal.

Conversely, because some nitrile groups in PAN aquagel are much more reactive than others, the distribution of the newly formed groups will be different than in the products of dissolved PAN. In particular, the distribution of conversions per chain will be much broader, and in some cases, the distribution will be bimodal. The sequential distribution of the conversions in the Heterogeneous reaction product will, to some extent, reflect the organization of the parent PAN aquagel.

This distribution of conversions in the PAN aquagel Heterogeneous reaction product promotes sharper phase separation and the formation of a better organized crystalline phase, which results in improved mechanical properties and improved thermal stability.

For instance, two copolymers A and B with a similar water content are processed under identical conditions, namely, cast on a glass plate from 10% (w/w) copolymer solution in dimethylsulfoxide and coagulated with water.

Figure 2:
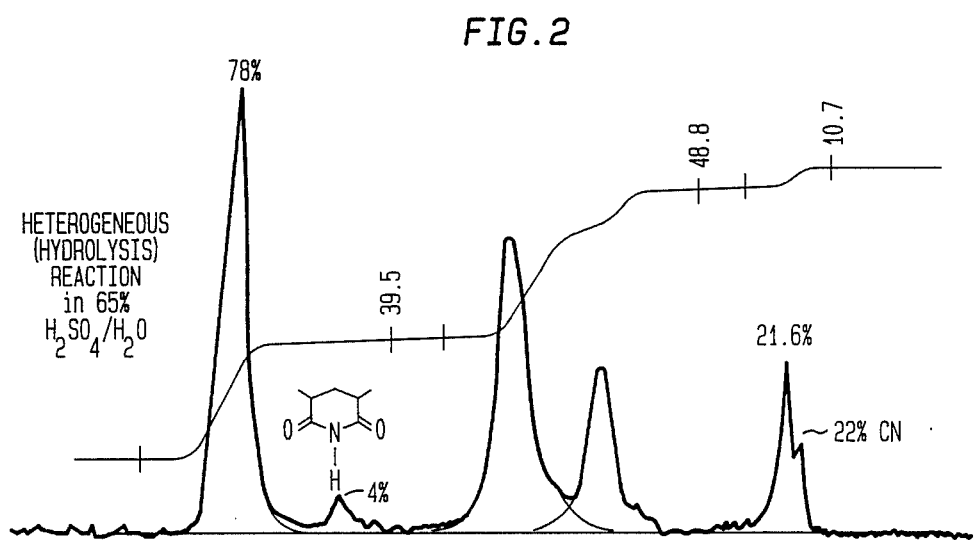
FIG. 2 shows the $^{13}$C-NMR spectra in the $CH_2$ and CH region of a 10% copolymer prepared by the Heterogeneous reaction of aquagel of the present invention in a 65% by weight aqueous solution $H_2SO_4$. The $^{13}$C-NMR spectra (measured as in FIG. 1) graphically shows that glutarimide groups are present in the reaction product.

Copolymer A was prepared by the Heterogeneous reaction of PAN aquagel according to Example 5, but with a longer reaction time, while Copolymer B was prepared by the Homogeneous solution reaction of the same PAN, using a mixture of 98% sulphuric acid and 85% phosphoric acid, as a solvent, in a 1:2 ratio. Then $^{13}$C-NMR spectra and their peak identification are shown in FIGS. 1 and 2, respectively.

Although Copolymers A and B had the same water content, their chemical composition differed slightly, while their physical characteristics were profoundly different. The differences in physical characteristics indicate dramatic differences in structure. A comparison of the properties of Copolymers A and B, respectively, is summarized in Table 1:

TABLE 1

| PROPERTY | COPOLYMER A | COPOLYMER B |
|---|---|---|
| Water Content, % by wt. | 91.7 | 91.1 |
| MW (starting PAN) | 150,000 | 150,000 |
| Nitrile content, mol. % | 21.6 | 20 |
| Amide content, mol. % | 74.4 | 80 |
| Carboxyl content, mol. % | 0 | 0 |
| Glutarimide content, mol. % | 4 | 0 |
| Solubility | | |
| in 55% NaSCN in water | Soluble | Soluble |
| in DMSO | Soluble | Soluble |
| in DMSO/Glycerol 9:1; (amb. temp.) | Insoluble | Soluble |
| in Boiling water | Insoluble | Soluble |
| in Glycerol, 130° C. | Insoluble | Soluble |
| Tensile strength, psi (true stress at break) | 213 | 30.1 |
| Initial modulus of elasticity, psi | 12.96 | 4.74 |
| Elongation at break, % | 429 | 244 |

EXAMPLE 1

Polyacrylonitrile is soluble in 55% (by weight) aqueous solutions of NaSCN and/or Ca(SCN)$_2$. By coagulation of PAN dissolved in these solvents, stable porous aquagels are obtained. The water content of the aquagel is given by the composition of the solution used for coagulation. Table 1 describes a range of water contents in completely washed PAN aquagels as a function of PAN concentration in NaSCN solution.

TABLE 2

Water content in PAN aquagel, prepared by coagulation of PAN solution in deionized water.

| % PAN (by weight) | % WATER (by weight) |
|---|---|
| 15a | 74 |
| 22a | 64 |
| 27a | 61 |
| 30a | 54 |
| 33a | 50 |
| 30b | 60 |
| 33b | 37 | a Polyacrylonitrile MW = 150,000
b Polyacrylonitrile-Methylacrylate copolymer having a 94:6 molar ratio. MW = 100,000

The above materials, prepared in fiber or pellet form, are hydrolyzed in dilute NaOH solutions at room temperature.

The products of Heterogeneous (hydrolysis) reactions are copolymers of acrylonitrile-acrylamide acrylic acid-amidine derivatives. The hypothesized structure of the amidine group is illustrated immediately before Example 1, above. As the reaction temperature is raised the products become less homogeneous, due to the higher conversion rate of nitrile groups on the surface of the reactant then in its core, which in turn is due to the reaction rate exceeding the rate of diffusion. The reaction may be easily monitored by weighing the hydrolyzed product, since its swelling capacity in water increases with increased conversion.

The reaction product contains the original nitrile groups and amidine, amide and carboxyl groups. Conversion of carboxyl groups is accompanied by consumption of one molecule of NaOH and by evolution of one molecule of NH$_3$. By using titration methods it was found that the total concentration of base (NaOH and NH$_3$) does not change during the Heterogeneous reaction, since the reduction in NaOH concentration is equal to the increase in NH$_3$ concentration. In addition, the Heterogeneous (hydrolysis) reaction may be monitored with the help of a selective ammonium electrode. The overall conversion of PAN AQG in the reaction was determined by $^{13}$C-NMR spectroscopy, which also indicated that residual nitrile groups are organized in continuous blocks.

EXAMPLE 2

The following is an example of the Heterogeneous (hydrolysis) reaction of a PAN aquagel prepared from a 15% solution of PAN in a 55% aqueous solution of NaSCN. By coagulation in deionized water, a PAN aquagel was prepared in the form of a thick filament (diameter about 3 mm). The aquagel was washed to remove all traces of NaSCN. Then the fiber was cut into pellets (3×3 mm). A mixture of 2100 g of PAN pellets and 16,561 g of 2.99% NaOH solution was reacted at 22° C. During hydrolysis, the weight gain of the pellets and the concentrations of NH$_3$ and NaOH were monitored.

Figure 3:
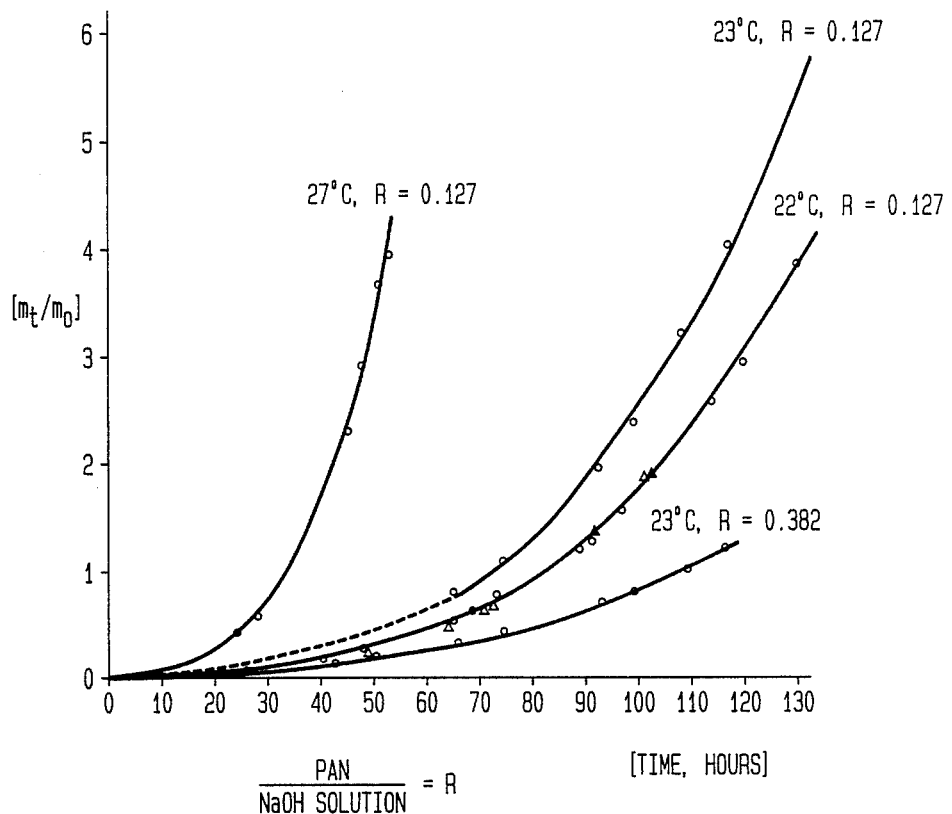
FIG. 3 is a graph showing the swelling of PAN aquagel as a function of time and temperature during the Heterogeneous reaction of the present invention, as described in Example 2.

In FIG. 3, the swelling of PAN AQG during Heterogeneous (hydrolysis) reaction in a 3% aqueous NaOH solution was plotted as a function of time, over a 130 hour period. Swelling was expressed as $M_t/M_o$ where $M_t$ is the weight of the PAN aquagel at time t, m$_o$ is the weight of the PAN Aquagel at time t=0, and R is the weight ratio of PAN AQG and the NaOH solution (R=PAN/NaOH solution).

After reacting for 101 hours, the PAN aquagel pellets were neutralized with a 5% (by weight) solution of H$_2$SO$_4$ and then washed with deionized water. The concentration of carboxyl groups in the polymer was found to be 20%±1% by titration of the NaOH solution used for the reaction, as well as by titration of the carboxyl groups in the polymer. Titration of the polymer was carried out in the following manner: the acid form of the polymer was neutralized and dried at 100° C. under reduced pressure for 48 hours. A known amount of polymer was mixed with a known amount of H$_2$SO$_4$ and after filtration the acid was titrated against NaOH.

The acid form of the polymer was neutralized with ammonium bicarbonate and dried. It was then dissolved in a 55% aqueous solution of NaSCN to prepare a solution comprising 10% by weight of the polymer. A 1 mm thick foil was cast and coagulated in 0.9% NaCl solution until it was in equilibrium with saline. At equilibriaum, the foil contained 92% saline.

Both the acid and alkaline forms of the polymer (carboxyl or amide groups) were dissolved in a 55% solution of NaSCN in D$_2$O and $^{13}$C-NMR spectra of both forms was measured. Total conversion of nitrile groups from $^{13}$CHCN intensity was found to be less than 32%. By combining the results of the $^{13}$C-NMR with the titration data, it was determined that the copolymer contains about 6% amidine groups, about 8% amide groups, about 16% carboxyl groups (ammonium salt form) and about 70% nitrile groups (as measured in molar percents).

Similarly, Heterogeneous (hydrolysis) reaction of PAN aquagel prepared from higher concentrations of PAN in water-NaSCN solution was also studied. It was found that by varying the reaction parameters and time of hydrolysis, the overall composition of the product could be controlled, producing a broad spectrum of waterswellable polymers with water contents varying from 60% to more than 99% water.

EXAMPLE 3

A solution of polyacrylonitrile obtained by polymerization of the monomer using a redox catalyst of pursulfate and bisulfite in a 70% zinc chloride aqueous solution was cooled and poured in a thin stream into a mixture of cold water and crumbled ice, and coagulated at 0° C. The resulting fibrous mass was then partially washed in water and laid, still wet, onto a PVC grid which was placed in a closed vessel just above the surface of 37% hydrochloric acid solution at 24° C. After 4 days in the vessel at 24° C. the washed sample of the mass became transparent and easily stretchable. After 8 days in the vessel the sample began to become elastomeric. In order to maintain the concentration of HCl in the vapors sufficiently high, some concentrated sulphuric acid was added to the hydrochloric acid while samples of the polymer were being removed. The elastomeric copolymer was neutralized in a dilute aqueous solution of sodium hydrocarbonate, washed in water and tested. The tests showed that the copolymer was a true multiblock copolymer of acrylamide and acrylonitrile, and when swelled in water to equilibrium it had a water content of about 64% by weight.

EXAMPLE 4

A washed non-dried PAN aquagel sample obtained according to Example 3 was immersed at 22° C. in a dilute aqueous solution of methylene blue. In a short time it became deeply colored, and the hue was not markedly reduced by washing.

The same aquagel sample was first dried by leaving it in the atmosphere (60% humidity) at room temperature for 16 hours. The volume of the material was reduced and it did not absorb methylene blue under the same conditions recited above, but instead remained colorless after being rinsed in water. When this sample was exposed to HCl in the manner recited in Example 3, only a very thin surface layer became hydrolyzed.

EXAMPLE 5

A 15% by weight polyacrylonitrile solution was prepared in aqueous sodium triocyanate (60% by weight). The solution was heated to 40° C. and coagulated in a 30% by weight solution of sodium thiocyanate by drawing the polyacrylonitrile solution through the coagulation bath to form long fibers. The fibers were fully washed in deionized water and found to contain 75.8% by weight of water.

The fibers were soaked in an excess of 67.5% sulfuric acid solution and allowed to come to equilibrium in the solution. The concentration of the excess acid at equilibrium was found to be 64.73% by weight. The excess acid was removed and the fibers were immersed in mineral oil at 55° C. for five hours. After five hours, the fibers were removed from the oil and completely washed in deionized water. The fibers were then dried and pulverized to a fine powder.

The ground copolymer was dissolved in dimethylsulfoxide (DMSO) to form a solution containing 10% polymer by weight. A film was then cast from this solution. The film was washed in deionized water to remove the DMSO. One piece of the film was soaked was soaked in a 1% sulfuric acid solution, and another piece in a 1% bicarbonate solution, for several hours. Both pieces were subsequently completely washed in deionized water, dried, and each was measured for uptake of water. The 1% sulfuric acid treated film had a water uptake of 9.6 grams of deionized water per gram of polymer (90.6% water by weight), and the 1% sodium bicarbonate treated film had a water uptake of 73.75 grams of deionized water per gram of polymer (98.66% water by weight). $^{13}$C-NMR analysis of the samples, as performed in Examples 1 and 2, detected the presence of continuous sequences of acrylonitrile groups in each of the samples.

EXAMPLE 6

A 15% by weight polyacrylonitrile solution was prepared in aqueous sodium thiocyanate (60% by weight). The solution was heated to 80° C. and coagulated in deionized water at room temperature by drawing the solution through the water to form long fibers. These fibers were subsequently washed in deionized water to remove the sodium thiocyanate. The fibers were found to have a water content of 72.6% by weight.

The fibers were soaked to equilibrium for 18 hours in excess aqueous sulfuric acid solution, 67.56% by weight, at 4° C. The equilibrium concentration of sulfuric acid in the fibers was found to be approximately 64.65% by weight. Excess sulfuric acid was removed from the fibers, and the fibers were soaked in mineral oil at a temperature of 45° C. for several hours. Samples were taken after 4.5, 5.5 and 6.67 hours. These samples were washed in deionized water, dried and pulverized to a fine powder.

The pulverized samples were dissolved in dimethyl sulfoxide to a concentration of 10% polymer by weight and one millimeter thick films were cast from this solution. The films were washed in deionized water and dried for 48 hours. The dried films were then measured for their capacity to absorb water. The water content was recorded at 62.7% by weight for the sample soaked in mineral oil for 4.5 hours, 69.0% by weight for the sample soaked in mineral oil for 5.5 hours, and 72.2% for the sample soaked in mineral oil for 6.67 hours. $^{13}$C-NMR data on the samples indicated that the samples contained 72%, 67% and 59% (molar percent) of nitrile groups, respectively. In each case, the nitrile groups were organized in continuous sequences.

EXAMPLE 7

Multiblock copolymer fibers prepared according to Example 6, containing 82.5% water, were cut into pellets about 3 mm long. Ten kilograms of the pellets were mixed with 10 kg of dimethylsulfoxide (DMSO) and 2.5 kg of water for 12 hours. The water in the pores of the pellets, which was present due to porosity of the original aquagel, was replaced with a DMSO water mixture without dissolving the polymer. The pellets were then removed from the excess liquid and dried in an oven at 60° C. until their weight was reduced to 5 kg. The pellets were then extruded at 135° C. to form tubing. The cooled tubing was cut to a 12 inch length tube and one end was shaped in a radio-frequency heated dye to an oblong conical tip to form a semi-finished suction catheter.

The semi-finished suction catheter, still containing DMSO as the melting aid, was dipped for 60 seconds into a mixture of 9 parts concentrated sulfuric acid and 1 part glycerol at 95° C., and then washed thoroughly in water. The tubing had a water content of about 50% and had a highly hydrated, slippery surface layer.

This procedure was possible because the hydrolysis in the previous example did not cause dissolution of the polymer, so that the apparent porosity of the starting aquagel was preserved.

EXAMPLE 8

Fifteen kilograms of PAN (MW=150,000) was dissolved in 80 kg of a 55% solution of NaSCN in water. Three kilograms of fine barium sulphate powder was dispersed in 5 kg of the NaSCN solution and mixed into the PAN solution and thoroughly homogenized. The solution was extruded in excess water and washed to form a string about 3 mm in diameter and containing about 70% water.

The aquagel string was then hydrolyzed by dilute sulfuric acid as described in Example 6, and then processed by melt extrusion as described in Example 7. The tubing was radiopaque and useful for various medical purposes, such as a wound drain.

This example shows that inert fillers, such as barium sulphate, do not affect aquagel formation or the subsequent Heterogeneous reaction.

EXAMPLE 9

A 20% solution of a copolymer of acrylonitrile with 7 molar % methylacrylate (MW=110,000) in DMSO was spread on a glass plate to a layer about 2 mm thick and exposed to cold air with relative humidity of over 85%. The solution gelled into a rubbery sheet due to the absorption of water vapor, and was then washed with water. Once washed, the aquagel sheet was rigid and translucent with no apparent porosity, it contained about 70% water.

The aquagel was then soaked for 16 hours at room temperature in a mixture of 65 parts concentrated sulfuric acid and 35 parts methoxypolyethyleneoxide (MW=500). The aquagel strips, which neither dissolved nor swelled appreciably in the mixture, were then removed from the mixture and heated to 60° C. for 20 hours. The strips were cooled and then were washed in water to form highly swellable and strong polymers. As shown in Table 2, swelling these polymer strips to equilibrium in various salts and at varying pH levels resulted in negligible differences in liquid content due to salt effects or pH-dependent swelling.

The polymer also displayed a very low-specific sorption of proteins. These results show that the alcoholysis of the nitrile groups of PAN AQG result from reaction with the end OH-group of the polyethylene oxide. There are no other previously known hydrolysis-modified PAN polymers with a similar combination of properties.

TABLE 3

| Liquid content (in wt %) of PAN aquagel swollen to equilibrium in various swelling agents. | |
|---|---|
| Swelling Agent | Liquid content, wt % |
| distilled water | 95.40 |
| tap water | 95.37 |
| 0.9% NaCl | 94.86 |
| 2% K$_2$HPO$_4$ | 95.04 |
| 5% MgSO$_4$ | 94.90 |
| 1% sulfuric acid | 94.78 |
| 1% NaOH | 95.18 |

EXAMPLE 10

Three hundred and fifty (350) grams of PAN (MW=150,000) was dispersed in 650 grams of cold 45% NaSCN solution in water. The dispersion was fed into an extruder with a mixing screw and barrel temperature of 110° C., and extruded to form tubing. The cooled tubing was rubbery and non-sticking. It was then washed with water in a separate step. Once all the NaSCN was removed, the tube was immersed in methanol which gradually replaced the water in the tubing without changing the dimensions of the tubing.

The tubing was then immersed in excess solution consisting of 20 parts concentrated sulfuric acid, 40 parts of polyethyleneglycol (MW=600) and 40 parts of methanol for 24 hours at room temperature. The tubing was then removed from the liquid, dried for 2 hours at 60° C. to evaporate the methanol, and heated for 12 hours at 95° C. After washing with water to remove the acid and excess polyethylene glycol, very strong, cross-linked tubing was obtained. Cross-linking was indicated by both the swellability and insolubility of the sample in a solution of 55% NaSCN in water. Additionally, the material had low sorption for proteins.

EXAMPLE 11

A 15% solution of PAN in dimethylformamide was cast on glass to form a layer of about 0.5 mm in thickness. The solution was allowed to partially gellify by absorption of moisture from the air, and was then washed thoroughly in water to form a finely porous membrane. The membrane was then soaked in anhydrous glycerol allowing the glycerol to replace the water in the membrane without changing its dimensions. After several hours, the glycerol containing membrane was heated to 165° C. for 30 minutes, and then washed with water.

The resulting hydrophilic asymmetric membrane was cross-linked by the reaction of the PAN -CN groups with the OH groups from the glycerol. The membrane maintained its porosity even after drying and reswelling, and was thermally stable under autoclaving conditions. This example shows that at increased temperatures, the reaction of PAN AQG with alcohols proceeds even in the absence of a catalyst. The glycerol/-PAN cross-links stabilize the porous structure of the aquagel and simultaneously hydrophilize the porous surface.

In a comparative experiment, in which the PAN AQG membrane was treated similarly, except for the heat treatment step which was purposely omitted, the treated PAN AQG membrane experienced a decrease in its porosity after drying. The porosity could be recovered by reswelling.

In another comparative experiment, the PAN AQG membrane was first dried to eliminate the aquagel state, then put into glycerol and heated in the manner described above. The resulting polymer was an essentially nonporous, hydrophobic and brittle foil. This experiment shows that glycerol does not react with undissolved PAN unless it is in the aquagel state.

While the invention has been described with reference to the specific methods and compositions recited in the description and examples, it will be appreciated by those of ordinary skill in the art that various modifications may be made to the methods and compositions of this invention without departing from its spirit and scope.

We claim:

1. A method for preparing polyacrylonitrile copolymers comprising:
    combining at least one polyacrylonitrile polymer in an aquagel state with a fluid reagent which reacts with nitrile groups of the polyacrylonitrile, said at least one polyacrylonitrile polymer is maintained undissolved in the aquagel state throughout the reaction to yield said polyacrylonitrile copolymers.

2. The method recited in claim 1, said polyacrylonitrile polymers contain at least 85% by weight acrylonitrile units.

3. The method recited in claim 2, whereby said polyacrylonitrile copolymers are multiblock copolymers.

4. The method recited in claim 3, whereas said fluid reagent comprises a solution of base catalyst in a watermiscible solvents of said base catalysts.

5. The method of claim 4, wherein said base catalyst is selected from the group consisting of:
   (i) alkali metal hydroxides, alkali metal carbonates, alkaline earth metal hydroxides, aliphatic amines, aliphatic mono-amines, aliphatic di-amines, aliphatic tri-amines, quaternary alkylammonium hydroxide;
   (ii) the salts of said alkali metal hydroxides, alkali metal carbonates, alkaline earth metal hydroxides, aliphatic amines, aliphatic mono-amines, aliphatic di-amines, aliphatic tri-amines, quaternary alkylammonium hydroxides; and,
   (iii) ammonia.

6. The method of claim 5, wherein said water miscible solvent is water.

7. The method of claim 5, wherein said water miscible solvent is a lower aliphatic alcohol with one to four carbon atoms.

8. The method of claim 2, wherein said fluid reagent comprises a solution of acid catalyst in watermiscible solvent of said acid catalyst.

9. The method of claim 8, wherein said acid catalyst comprises an inorganic acid.

10. The method of claim 8, wherein said acid catalyst comprises an organic acid in aqueous solution with a pH less than 2.

11. The method of claim 8, wherein said acid catalyst is selected from the group consisting of sulfuric acid, nitric acid, hydrochloric acid, Lewis acids, phosphoric acid, trichloracetic acid, toluenesulfonic acid, polyethelene sulfonic acid, oxalic acid, and hydrofluoric acid.

12. The method of claim 11, wherein said water miscible solvent is water.

13. The method of claim 11, wherein said water miscible solvent is a lower aliphatic alcohol with one to four carbon atoms.

14. The method of claim 1, wherein said polyacrylonitrile polymers in the aquagel state are prepared according to the following steps:
    (a) dissolving polyacrylonitrile in a watermiscible solvent which is capable of dissolving the polyacrylonitrile, but incapable of reacting with said nitrile side-groups of the polyacrylonitrile;
    (b) coagulating the polyacrylonitrile in the solution by replacing the water-miscible solvent of polyacrylonitrile with a watermiscible fluid which is incapable of dissolving polyacrylonitrile at temperatures below 80° C.,
    whereby the polyacrylonitrile polymer is coagulate in the aquagel state.

15. The method of claim 14, whereby said polyacrylonitrile polymer in the aquagel state is coagulated while it is being formed to a predetermined shape.

16. The method of claim 14, wherein said watermiscible fluid which is incapable of dissolving polyacrylonitrile at temperatures below 80° C. is an aqueous fluid.

17. The method of claim 16, wherein said aqueous fluid is water.

18. The method of claim 14., wherein said watermiscible fluid which is capable of dissolving polyacrylonitrile at temperatures below 80° C. is a lower aliphatic alcohol containing from 1 to 4 carbon atoms per molecule.

19. The method of claim 14, wherein said polyacrylonitrile solvent includes a concentrated aqueous solution of inorganic compound selected from the group consisting of calcium thiocyanate, sodium thiocyanate, zinc chloride, lithium bromide, magnesium perchlorate, perchlorate, phosphoric acid and nitric acid.

20. The method of claim 14, wherein said polyacrylonitrile solvent includes a substantially anhydrous organic compound selected from the group consisting of dimethylsulfoxide, dimethylformamide, gammabutyrolactone, tetramethylenesulfone and dimethylacetamide.

21. The method of claim 14, wherein the coagulation of polyacrylonitrile is carried out in the following steps:
(a) gelling the polyacrylonitrile polymer solution by changing the physical conditions of the solution in the presence of said solvent; and
(b) replacing all of the solvent in the gelled solution with said water-miscible fluid which is incapable of dissolving polyacrylonitrile at temperatures below 80° C.

22. The method of claim 19, wherein the gelling of the solution is accomplished by decreasing the temperature of the solvent below the point of gelation.

23. The method of claim 19, wherein the gelling of the solution is carried out by absorption of humidity surrounding medium.

24. The method of claim 1, wherein said reaction is carried out in the absence of an excess of said fluid reagent outside of the polyacrylonitrile aquagel.

25. The method of claim 24, further comprising:
(a) replacing by diffusion a coagulation fluid present in said polyacrylonitrile polymer aquagel with said fluid reagent;
(b) removing the polyacrylonitrile aquagel soaked with said fluid reagent from the excess fluid reagent; and,
(c) increasing the temperature of the aquagel to a value at which the reaction proceeds at a desired rate.

26. The method of claim 25, wherein said diffusion of fluid reagent is performed at a temperature which allows the reaction to proceed at a lower rate than the diffusion.

27. The method of claim 25, wherein the increase of the temperature of the aquagel is performed in a liquid medium which is immiscible with said fluid reagent and is incapable of dissolving the polyacrylonitrile polymer.

28. The method of claim 25, wherein the step of increasing the temperature of the aquagel is performed in a closed container which is saturated with vapors of the volatile component of said fluid reagent.

29. The method of claim 25, further including the step of stopping the reaction after a predetermined conversion is achieved by neutralizing said fluid reagent.

30. The method of claim 25, further including the step of stopping the reaction after a predetermined conversion is achieved by lowering the reaction temperature to a temperature where the reaction rate is negligible.

31. The method of claim 25, further including the step of stopping the reaction after a predetermined conversion is achieved by removing a component of the fluid reagent.

32. The method of claim 25, further including the step of stopping the reaction after a predetermined conversion is achieved by consumption of a component of said fluid reagent, the component is present in the amount which is incapable of reacting all nitrile groups present in the initial polyacrylonitrile polymer.

33. The method of claim 30, further including the step of washing the fluid reagent with a non-reactive fluid which does not dissolve polyacrylonitrile.

34. The method of claim 1, wherein the reaction is performed in an excess of said fluid reagent, a component of the fluid reagent depleted by the reaction in the polyacrylonitrile aquagel is replenished by diffusion from an outside source of said fluid reagent.

35. The method of claim 34, wherein the reaction is carried out at a temperature ranging from about 10° C. to about 80° C.

36. The method of claim 35, wherein said fluid reagent includes an alcohol.

37. The method of claim 36, wherein said fluid reagent includes an aliphatic alcohol containing from 1–4 carbon atoms per molecule.

38. The method of claim 37, wherein said alcohol includes an aliphatic alcohol having from 1–3 hydroxyl groups per molecule.

39. The method of claim 38, wherein said alcohol is an aliphatic polyether having at least one terminal hydroxyl group.

40. The method of claim 1, further including the step of replacing the fluid reagent after a predetermined reaction conversion is achieved by a plasticizing agent which is capable of plasticizing the undissolved reaction product.

41. The method of claim 40, wherein said plasticizing agent is present in said reaction product in the range of about 25% to about 75% by weight.

42. The method of claim 41, wherein said plasticizing agent is present in said reaction product in the range of approximately 40% to 60% by weight.

43. The method of claim 40, wherein said plasticizing agent is capable of plasticizing said reaction product at temperatures below 40° C. and dissolved the reaction product at temperatures above 70° C.

44. The method of claim 40, wherein said plasticizing agent includes dimethylsulfoxide.

45. The method of claim 40, wherein said plasticizing agent includes a good solvent of polyacrylonitrile which is diluted with a volatile liquid which is a poor solvent of polyacrylonitrile, the mixture being a poor solvent of polyacrylonitrile thereafter said volatile fluid is partially removed by evaporation.

46. The method of claim 43, wherein said good solvent of polyacrylonitrile includes dimethylsulfoxide and said poor solvent of polyacrylonitrile includes water.

47. The method of claim 1, wherein said polyacrylonitrile copolymers are swellable in water.

48. The method of claim 1, wherein said polyacrylonitrile copolymers are further reacted with additional reagents to modify the reacted nitrile groups.

49. The method of claim 48, wherein said additional reagents modify the remaining nitrile groups.

50. The method of claim 1, for preparing polyacrylonitrile copolymers further comprising the steps of:
   (a) dissolving polyacrylonitrile in a watermiscible solvent which is capable of dissolving the polyacrylonitrile, but incapable of reacting with said nitrile side-groups of the polyacrylonitrile;
   (b) coagulating the polyacrylonitrile in the solution by replacing the water-miscible solvent of polyacrylonitrile with a watermiscible fluid which is incapable of dissolving polyacrylonitrile, while shaping said aquagel into a first shape;
   (c) replacing said water-miscible fluid which is incapable of dissolving polyacrylonitrile with a fluid reagent which reacts with a nitrile group of a polyacrylonitrile polymer, but is incapable of dissolving the polyacrylonitrile aquagel polymer under the reaction conditions all the while maintaining said first shape, said polyacrylonitrile aquagel polymer is maintained undissolved in the aquagel state throughout the reaction to yield said polyacrylonitrile copolymers; and,
   (d) extracting a component of said fluid reagent from the polyacrylonitrile copolymer reaction product.

51. The method of claim 50, wherein said polyacrylonitrile polymer contains at least 85% of acrylonitrile units.

52. The method of claim 51, wherein said watermiscible solvent is a water-miscible polar solvent, and said solution of said polyacrylonitrile polymer and said water-miscible polar solvent has a concentration ranging from about 5% to about 40% by weight polyacrylonitrile at a maximum temperature of 70° C.

53. The method of claim 50, further comprising the step of eliminating any undesired fluid reagent by washing in water.

54. The method of claim 50, further comprising the step of eliminating any undesired fluid reagent by neutralization.

55. The method of claim 50, wherein said first shape includes shapes selected from the group consisting of a pellet, tube, film, ribbon, membrane, sheet, fiber, hollow fiber, bead, regular particle, irregular particle, and lens.

56. The method of claim 50, wherein said shaped copolymer is further processed to form a second shaped article.

57. The method of claim 56, wherein said shaped copolymer is processed by adding a plasticizer and shaping the polyacrylonitrile copolymer thus obtained to said second shaped article.

58. The method of claim 57, wherein said plasticizer is a water-miscible solvent polyacrylonitrile which is added in an amount and a concentration which is capable of swelling said copolymer but incapable of dissolving said copolymer at room temperature.

59. The method of claim 50, wherein said copolymer is further processed by dissolving said copolymer is a water-miscible solvent and shaping the solution thus obtained to a second shape, said solution is then solidified by removing said solvent.

60. The method of claim 58, wherein said plasticizer is selected from the group consisting of dimethylsulfoxide, dimethyleformamide, gammabutyrolactone, tetramethylene, sulfone, dimethylacetamide, glycerol and 1,2-propylene glycol.

61. A method for preparing polyacylonitrile copolymers comprising the steps of:
   reacting at least one polyacrylonitrile polymer in an aquagel state with fluid reagent which reacts with nitrile groups of the polyacrylonitrile,
   the fluid reagent comprising at least one reactant selected from the group consisting of: water alcohols, olefins, esters, ammonia, amines, mercaptans, dihydrosulfide, azoimide, hydrazine, hydrazinehydrate;
   maintaining the polyacrylonitrile polymer undissolved in the aquagel state throughout the reaction to yield the polyacrylonitrile copolymer.

62. The method of claim 61 wherein the fluid reagent further comprises a catalyst.

63. The method of claim 62 wherein the catalyst is selected from the group consisting of acids and bases.

64. The method of claim 61 wherein the reaction is conducted between −5° C. and +20° C.

65. The method of claim 61 wherein the reactant is selected from the group consisting of: water, aliphatic alcohols of the formula ROH, glycols having from 2 to 4 carbon atoms, alkylamines of the formula R—$NH_2$, mercaptans of the formula R—SH, dihydrogensulfide, $HN_3$, hydrazine, hydroxylamine, secondary amines of the formula $HNR_1R_2$, ammonia, 2-aminoethanol and hydrazinehydrate, wherein R, $R_1$ and $R_2$ independently are straight chain or branched alkyl groups having from 1 to 8 carbon atoms.

66. The method of claim 65 wherein the fluid reagents further comprises a catalyst.

67. The method of claim 66 wherein the catalyst is selected from the group consisting of acids and bases.

68. The method of claim 65 wherein the reaction is conducted between −5° C. and +200° C.

* * * * *